United States Patent [19]

Atkinson

[11] Patent Number: 5,515,374
[45] Date of Patent: May 7, 1996

[54] METHOD AND APPARATUS FOR HOPPING DIGITAL PACKET DATA SIGNALS

[75] Inventor: Frederick G. Atkinson, Winfield, Ill.

[73] Assignee: Motorola, Inc., Schaumburg, Ill.

[21] Appl. No.: 414,457

[22] Filed: Mar. 31, 1995

[51] Int. Cl.$^6$ ............................. H04J 3/16; H04Q 7/30
[52] U.S. Cl. ..................... 370/80; 370/85.2; 370/95.1
[58] Field of Search ................ 370/50, 69.1, 85.2,
370/85.3, 95.1, 95.3, 94.2, 85.7, 79, 80,
81, 16; 455/54.1, 54.2, 34.1; 340/825.5,
825.52

[56] References Cited

U.S. PATENT DOCUMENTS

| | | | |
|---|---|---|---|
| 4,837,858 | 6/1989 | Ablay et al. | 370/94.2 |
| 4,939,510 | 7/1990 | Masheff et al. | 370/85.2 |
| 5,077,532 | 12/1991 | Obermann et al. | |
| 5,282,204 | 1/1994 | Shpanger et al. | 370/94.2 |
| 5,335,226 | 8/1994 | Williams | 370/85.2 |
| 5,453,987 | 9/1995 | Tran | 370/85.3 |

*Primary Examiner*—Wellington Chin
*Assistant Examiner*—Chau T. Nguyen
*Attorney, Agent, or Firm*—Jeffrey G. Toler

[57] ABSTRACT

A method (300) and apparatus (200) provide for determining when a digital packet data signal and a voice signal are being concomitantly transmitted on a voice channel of a communication system. A sample of the transmitted signal (110) is compared (310) to a pre-transmitted sample of the digital packet data signal (108). In response to the comparison, a digital packet data transceiver hops (314–320) from the first voice channel to a different voice channel for transmitting the digital packet data signal when voice signals are present.

18 Claims, 3 Drawing Sheets

METHOD AND APPARATUS FOR HOPPING DIGITAL PACKET DATA SIGNALS

FIELD OF THE INVENTION

The present invention relates generally to communication systems, and more particularly, to a method and apparatus for hopping a digital packet data signal on voice channels of a communication system.

BACKGROUND OF THE INVENTION

Communication systems are well known and consist of many types including land mobile radio, cellular radiotelephone, personal communication system (PCS), and other communication system types. Within the communication system, transmissions are conducted between a transmitting entity and a receiving entity over a communication resource, commonly referred to as a communication channel. To date, the transmissions have typically consisted of voice signals. More recently, however, it has been proposed to carry other forms of data signals. For ease of operation, it is preferable to have the data transmission capability overlay the existing voice communication capability, such that its operation is essentially transparent to the voice communication system while still utilizing the communication resources and other infrastructure of the voice communication system.

One such service associated with cellular radiotelephone communication systems is known as cellular digital packet data (CDPD). The processing of digital packet data signals within the CDPD system is separate from the processing of voice signals in the cellular radiotelephone communication system. However, the CDPD system is integrated with the cellular infrastructure to utilize its voice channels for transmission of digital packet data signals.

Because the CDPD equipment is overlaid on the cellular infrastructure and its operation is essentially transparent to the cellular system, there is no coordination between the two. Thus, the CDPD system must be capable of identifying an unused voice channel on which to transmit so that it does not disrupt voice communications within the cellular system. However, even if the voice channel is unoccupied at the time transmission begins, it is possible that the cellular infrastructure will assign a voice user to the same traffic channel. In this event, the CDPD equipment must quickly detect the presence of the voice user, terminate its transmission and seek out a new unoccupied voice channel on which to resume transmission, i.e., hop from the current voice channel to a new voice channel.

To avoid interfering with the voice user, and degrading the quality of the voice transmission, the hopping capability of the CDPD equipment must respond quickly to the presence of a voice user. That is, it typically must identify the presence of voice signals keying up on the voice channel in approximately 40 milliseconds (msec) or less and hop from the current voice channel to an alternate voice channel. However, the voice signal may be much lower in power than the CDPD digital packet data signal occupying the same channel making detection very difficult. Existing devices, such as scan receivers and subscriber receivers, are disadvantaged by an inability to detect the voice signals, which appear as an interfering co-channel signal, when the voice signal is much lower in power than the existing digital packet data signal. And, even if they were capable of detecting the voice signal, their relatively slow operation would not provide the necessary hopping performance.

Therefore, a need exists for a method and apparatus for hopping digital packet data signals on voice channels of a communication system that quickly identifies the presence of voice signals on the voice channel and selects an alternate communication channel for transmitting the digital packet data signals.

DETAILED DESCRIPTION OF THE PREFERRED EMBODIMENT(S)

The present invention provides a method and apparatus for determining when a digital packet data signal and a voice signal are being concomitantly transmitted on a voice channel of the communication system. A sample of the transmitted signal is compared to a pre-transmitted sample of the digital packet data signal. In response to the comparison, a digital packet data transceiver hops from the voice channel to a different voice channel for transmitting the digital packet data signal when the voice signal is present.

The present invention is described in a preferred embodiment, as an overlay to a cellular radiotelephone communication system. It will be well understood that the description of the preferred embodiment is provided to make clear an understanding of the present invention and in no way limits the scope of the invention.

Figure 1:
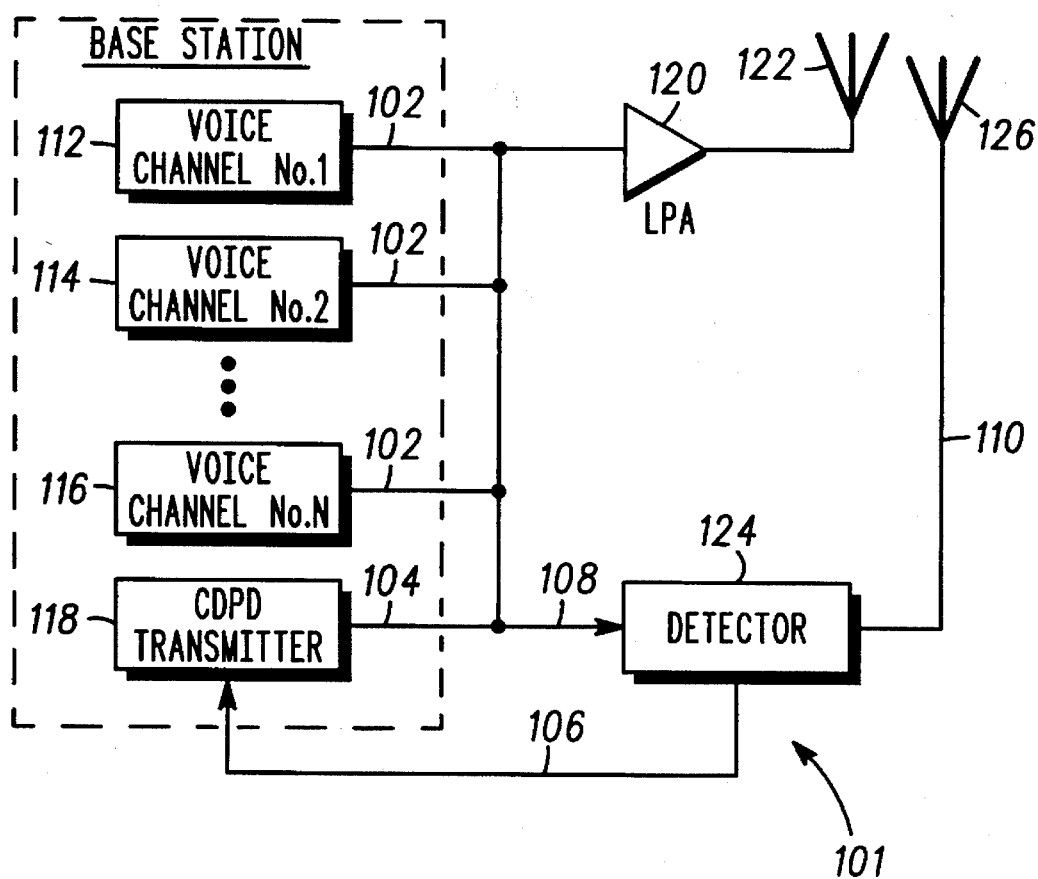
FIG. 1 is an exemplary base station of a cellular radiotelephone communication system having cellular digital packet data service and incorporating a digital packet data signal hopping apparatus in accordance with a preferred embodiment of the present invention.

Shown in FIG. 1, a base station 100 of a cellular radiotelephone communication system incorporates CDPD service and a hopping apparatus 101 according to a preferred embodiment of the present invention. Base station 100 is suitably coupled, as is well known, to at least a mobile switching center (MSC), not shown, and potentially a base station controller (BSC), not shown, for providing cellular radiotelephone communication services to subscriber communication units operating within the communication system. Base station 100 includes a plurality of voice channel transceivers 112–116 for providing voice communication services to the subscriber units. In addition, base station 100 includes a cellular digital packet data (CDPD) transceiver 118. Output transmission signals, either voice signals 102 from voice channel transceivers 112–116 or a digital packet data signal 104 from CDPD transceiver 118 are combined and amplified for transmission through linear power amplifier (LPA) 120 and transmitted over antenna 122. It should be understood that as used herein, a voice channel transceiver provides communication on a voice channel, which in the preferred embodiment, may refer to a pair of communication frequencies in a frequency division multiple access (FDMA) communication system or a timeslot in a time division multiple access (TDMA) communication system.

In the preferred embodiment, CDPD transceiver 118 is operable to receive digital packet data through the cellular network and to transmit the digital packet data within the cellular communication system on any one of the plurality of voice channels available. CDPD transceiver 118 is shown preferably integrated into base station 100. Its operation, however, is essentially stand alone and one will appreciate that it need not be integrated into base station 100. Moreover, although one CDPD transceiver is shown, a plurality of CDPD transceivers may be provided without departing from the fair scope of the present invention.

Shown in FIG. 1, in conjunction with CDPD transceiver 118, hopping apparatus 101 includes a detector 124 for detecting the presence of voice signals on a voice channel presently being used by CDPD transceiver 118 and for generating a control signal 106 to CDPD transceiver 118 indicative of the presence of voice signals 102 on the voice channel. Detector 124 is shown as a separate element for clarity, however, it should be understood that it may be integrated into CDPD transceiver 118 without departing from the fair scope of the present invention. If there is voice signals on the voice channel, CDPD transceiver 118 is operable to transfer, or hop, to a new voice channel for resumption of digital packet data transmission.

Detector 124 receives a first sample signal 108 which is a sample of the pre-transmitted output signal 104 of CDPD transceiver 118. Detector 124 also receives a second sample signal 110 which is a sample of the transmitted signal from CDPD transceiver 118 and the voice channel transceivers 112–116 via a sense antenna 126 which is physically located near antenna 122. Detector 124 makes a comparison of these signals and provides the control signal 106 to CDPD transceiver 118.

Figure 2:
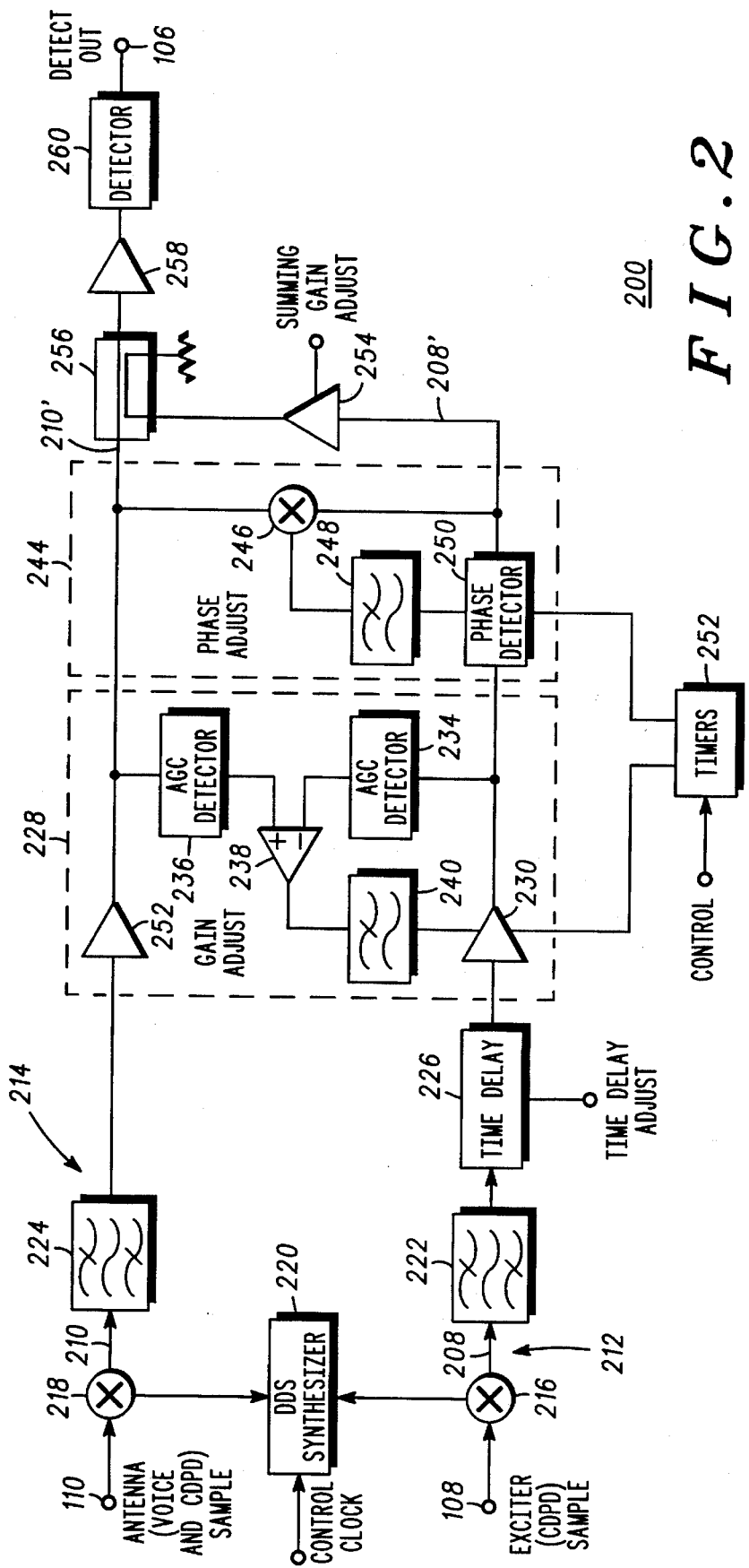
FIG. 2 is a detailed block diagram of a voice signal detection circuit in accordance with a preferred embodiment of the present invention.

Shown in FIG. 2, a detector circuit 200 incorporated within detector 124 and in accordance with the present invention provides for generating control signal 106. Detector circuit 200 includes first signal path 212 and second signal path 214 for processing, first sample 108 and second sample 110, respectively. Each signal path, 212 and 214, contains a mixer 216 and 218, respectively, which receive an input signal from a direct digital synthesizer 220 for downconverting signals 108 and 110 to intermediate frequency signals 208 and 210, respectively. In this manner, the present invention advantageously employs intermediate frequency (IF) signal processing allowing the use of readily available signal processing hardware as is known in the art. The downconverted signals 208 and 210 are then filtered using filters 222 and 224, respectively, to remove noise or adjacent channel signals appearing in the samples. Filtered signal 208 is then delay adjusted by delay element 226 to substantially time equalize signals 208 and 210. Delay element 226 is adjustable, however, adjustment should only be required upon initial setup of the system.

Signals 208 and 210 are then communicated to gain adjust circuit 228 where each are buffered in amplifiers 230 and 232, respectively. The output of amplifiers 230 and 232 are detected by voltage detectors 234 and 236, respectively, the outputs of which are communicated to difference amplifier 238. The output of difference amplifier is filtered through filter 240 and is applied as a gain control signal to the first signal path amplifier 230 to equalize the signal levels of signals 208 and 210.

Signals 208 and 210 are then communicated to phase adjust circuit 244, where they are sampled and the samples combined in combiner 246. The combined signal is applied to a phase detector/low pass filter 248 to produce a phase adjust signal applied to phase adjust element 250 to adjust the IF carrier phase of signal 208 to be substantially equal to the IF carrier phase of signal 210. It will be appreciated that both gain adjust circuit 228 and phase adjust circuit 244 are controlled via timer 252.

Time, gain and phase adjusted signal 208' is then amplified through adjustable amplifier 254, and signals 208' and 210' are then applied to a differencing circuit 256, shown as a directional coupler for descriptive purposes. Differencing circuit 256 provides a difference between signals 208 and 210. The effect is a canceling of approximately 30 decibels (dB) of the digital packet data signal sample 108 from the transmitted signal sample 110. The remaining signal is buffered in amplifier 258 and the output detected in threshold detector 260.

When voice signals are absent from the traffic channel on which CDPD transceiver 118 is transmitting digital packet data, the output voltage of threshold detector 260 is a low value. When voice signals become present on the voice channel being used to transmit digital packet data, such as when base station 100 assigns the voice channel for voice communication, the output voltage of threshold detector 260 becomes a high value. Hence, the output voltage signal of threshold detector 260 provides a comparison of the transmitted CDPD signal and the pre-transmitted CDPD signal. If the difference produces a high value, it is indicative of voice signals being present on the voice channel. Therefore, output voltage of threshold detector 260 may be applied as a control signal 106 to CDPD transceiver 118.

Figure 3:
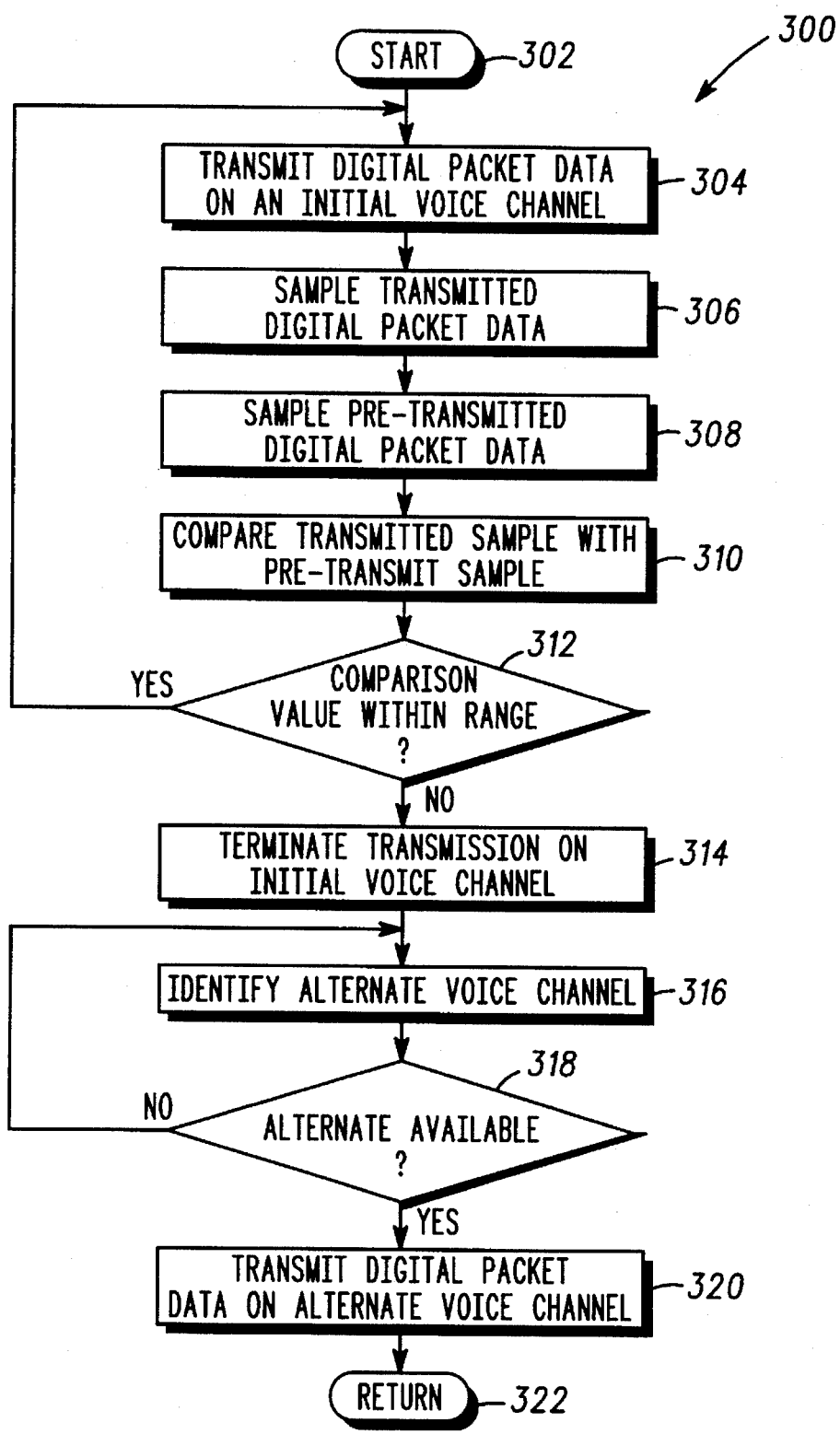
FIG. 3 is a flowchart illustrating the steps for hopping a digital packet data signal in accordance with a preferred embodiment of the present invention.

With reference to FIG. 3, the operation of hopping apparatus 101 and the method 300 of hopping a digital packet data signal are described. The method begins at step 302 and proceeds to step 304 where digital packet data is transmitted on an initial voice channel available at the base station. At step 306 a sample of the transmitted digital packet data, i.e., a sample of the transmitted voice channel, is taken, and at step 308 a sample of the pre-transmitted digital packet data, i.e., the output of CDPD transceiver 118, is taken.

At step 310 a comparison of the transmitted sample and the pretransmitted sample is made. In a preferred embodiment of the invention, the samples are differenced to produce a voltage signal as previously described. At decision step 312, if the comparison fails to indicate the presence of voice signals on the voice channel, i.e., the output voltage of detector 260 is below a threshold, CDPD transceiver 118 continues to transmit digital packet data on the voice channel. If, however, the comparison indicates that voice signals are present on the voice channel, CDPD transceiver 118 must vacate the voice channel in favor of the voice signals. CDPD transceiver 118 is informed of this condition by control signal 106, the output voltage of detector 260, exceeding an allowable range.

At step 314, CDPD transceiver 118 terminates transmission of digital packet data on the initial voice channel. This frees the voice channel for voice signals. Next at step 316, CDPD transceiver 118 identifies an alternate voice channel. This is accomplished in the same manner in which voice signals were detected on the initial channel. That is, a sample of a transmitted signal, on an alternate voice channel, is compared with a sample of CDPD transceiver 118 output. In the case of searching for an alternate voice channel, CDPD transceiver 118 is quiet. Therefore, the comparison is essentially the level of signal present on the alternate voice channel, i.e., if there is a signal present in signal path 214. If there are voice signals present on the alternate voice channel, the output voltage, i.e., control signal 106, will be high. At decision step 318, CDPD transceiver 118 looks at control signal 106 which is indicative of the presence of voice signals on the alternate voice channel. If the signal is low, the voice channel is available for resumption of transmission of digital packet data, step 320. If control signal 106 is high, the alternate channel also contains voice signals, and CDPD transceiver 118 continues its search to identify an available voice channel. Once transmission begins on the alternate voice channel, the method returns, step 322, such that the alternate voice channel becomes the initial voice channel and the method is repeated from the start, 302.

It will be appreciated from the foregoing that the present invention provides a method and apparatus which quickly identifies the presence of voice signals on a voice channel in use for CDPD service. Moreover, it provides for informing the CDPD transceiver 118 of this condition such that it may terminate transmission and identify an alternate voice channel on which to resume transmission of digital packet data. These and other features and advantages of the present invention may be readily appreciated from the foregoing description and the fair scope of the present invention may be ascertained from the subjoined claims.

I claim:

1. An apparatus for hopping a digital packet data signal on a plurality of voice channels in a communication system comprising:

a digital packet data transceiver, the digital packet data transceiver operable to transmit the digital packet data signal on a first of the plurality of voice channels within the communication system and to transmit the digital packet data signal on a second of the plurality of voice channels in response to a control signal;

a first sample path for communicating a first signal sample, the first signal sample comprising a sample of the digital packet data signal transmitted on the first of the plurality of voice channels;

a second sample path communicating a second signal sample, the second signal sample comprising a pre-transmitted digital packet data signal sample;

a comparator, coupled to the first signal path and the second signal path to produce the control signal, the control signal being indicative of a characteristic difference between the first signal sample and the second signal sample, and to communicate the control signal to the digital packet data transceiver such that the digital packet data transceiver transmits the digital packet data signal on the second of the plurality of voice channels.

2. The apparatus of claim 1 wherein the plurality of voice channels comprise one of the group consisting of a pair of communication frequencies in a frequency division multiple access (FDMA) communication system and a timeslot in a time division multiple access (TDMA) communication system.

3. The apparatus of claim 1 wherein the control signal is indicative of a presence of a voice signal on the first voice channel.

4. The apparatus of claim 1 wherein the second signal path further comprises gain, phase and delay compensation circuits for adjusting a gain, phase and delay of the second signal sample to be substantially gain, phase and time coincident with a gain, phase and delay of the first signal sample.

5. The apparatus of claim 1 wherein the first and second signal paths each comprise a first mixer and a second mixer, respectively, for downconverting the first signal sample and the second signal sample, respectively.

6. The apparatus of claim 1 wherein the first and second signal paths each comprise a first filter and a second filter, respectively, for filtering the first signal sample and the second signal sample, respectively.

7. The apparatus of claim 1 further comprising a sense antenna coupled to the first signal path.

8. A method of hopping a digital packet data signal between a plurality of voice channels within a communication system comprising:

(a) transmitting the digital packet data signal on an initial voice channel of the plurality of voice channels within the communication system;

(b) taking a first sample of the digital packet data signal transmitted on the initial voice channel;

(c) taking a second sample of the digital packet data signal prior to transmission on the initial voice channel;

(d) generating a comparison signal between the first sample and the second sample; and (e) terminating transmission of the digital packet data signal on the initial voice channel when the comparison signal is outside a range, selecting an alternate voice channel of the plurality of voice channels and transmitting the digital packet data signal on the alternate voice channel.

9. The method of claim 8 further comprising the step of:

repeating steps (b)–(e) for the alternate voice channel.

10. The method of claim 8 further comprising, prior to the step of transmitting the digital packet data signal on the alternate voice channel the steps of:

taking a sample of a signal being transmitted on the alternate voice channel;

determining if there are voice signal present on the alternate voice channel; and selecting another alternate voice channel of the plurality of voice channels if there are voice signals present on the alternate voice channel.

11. The method of claim 8 wherein the step of generating a comparison signal comprises the step of calculating a difference between the first sample and the second sample.

12. The method of claim 8 wherein the step of taking a second sample further comprises processing the second sample to be substantially coincident in time, gain and phase with a time, gain and phase of the first sample.

13. A base station, for hopping a digital packet data signal between a plurality of voice channels within a communication system, comprising:

(a) means for transmitting the digital packet data signal on a first of the plurality of voice channels within the communication system;

(b) means for taking a first sample of the digital packet data signal transmitted on the first voice channel;

(c) means for taking a second sample of the digital packet data signal prior to transmission on the first voice channel;

(d) means for generating a comparison signal between the first sample and the second sample; and (e) means for transferring transmission of the digital packet data signal from the first voice channel to a second of the plurality of voice channels when the comparison signal is outside a range.

14. The apparatus of claim 13 wherein the plurality of voice channels comprise one of the group consisting of a pair of communication frequencies in a frequency division multiple access (FDMA) communication system and a timeslot in a time division multiple access (TDMA) communication system.

15. The apparatus of claim 13 wherein the comparison signal is indicative of a presence of a voice signal on the first voice channel.

16. The apparatus of claim 13 further comprising means for detecting a presence of a voice signal on the second of the plurality of voice channels prior to transferring the transmission of the digital packet data signal.

17. The apparatus of claim 13 wherein the means for generating a comparison signal comprises means for calculating a difference between the first sample and the second sample.

18. The base station of claim 13 wherein the means for taking a second sample further comprises means for processing the second sample to be substantially coincident in time, gain and phase with a time, gain and phase of the first sample.

* * * * *